(12) United States Patent
Shin et al.

(10) Patent No.: US 8,999,499 B2
(45) Date of Patent: Apr. 7, 2015

(54) WHITE POROUS POLYESTER FILM AND PREPARATION METHOD THEREOF

(75) Inventors: Heon Jung Shin, Suwon-si (KR); Jae Seog Ju, Suwon-si (KR); Min Ju Kim, Pocheon-si (KR)

(73) Assignee: SKC Co., Ltd, Suwon-si (KR)

( * ) Notice: Subject to any disclaimer, the term of this patent is extended or adjusted under 35 U.S.C. 154(b) by 141 days.

(21) Appl. No.: 12/857,982

(22) Filed: Aug. 17, 2010

(65) Prior Publication Data

US 2011/0046254 A1    Feb. 24, 2011

(30) Foreign Application Priority Data

Aug. 20, 2009   (KR) .................. 10-2009-0077229

(51) Int. Cl.

| | | |
|---|---|---|
| *B32B 5/22* | (2006.01) | |
| *C08J 5/18* | (2006.01) | |
| *C08L 67/02* | (2006.01) | |
| *C08K 3/00* | (2006.01) | |
| *C08L 25/06* | (2006.01) | |
| *B29C 55/12* | (2006.01) | |

(52) U.S. Cl.
CPC ............... *C08J 5/18* (2013.01); *C08J 2367/02* (2013.01); *C08K 3/0033* (2013.01); *C08L 25/06* (2013.01); *C08L 67/02* (2013.01); *B29C 55/12* (2013.01)

(58) Field of Classification Search
USPC ................. 428/317.9, 315.5, 315.7; 521/182
See application file for complete search history.

(56) References Cited

U.S. PATENT DOCUMENTS

| | | | | |
|---|---|---|---|---|
| 5,457,018 A | * | 10/1995 | Sommer et al. | 430/533 |
| 2004/0266930 A1 | * | 12/2004 | Nishi et al. | 524/430 |
| 2009/0042016 A1 | | 2/2009 | Yoshida et al. | |
| 2009/0262539 A1 | * | 10/2009 | Ueda et al. | 362/296.02 |

FOREIGN PATENT DOCUMENTS

| | | |
|---|---|---|
| JP | 63-256712 A | 10/1988 |
| JP | 08-176329 A | 7/1996 |
| JP | 10-077355 A | 3/1998 |
| WO | 2008/040701 A1 | 4/2008 |

OTHER PUBLICATIONS

Translation of JP 08-176329, Ito et al., "Void-Containing Polyester Resin Film and Sheet," Jul. 9, 1996, 8 pages.*
Japanese Patent Office, Japanese Office Action issued in corresponding JP Application No. 2010-176600, dated Apr. 3, 2012.
Japanese Patent Office, Japanese Office Action issued in corresponding JP Application No. 2010-176600, dated Feb. 5, 2013.

(Continued)

*Primary Examiner* — Hai Vo
(74) *Attorney, Agent, or Firm* — Sughrue Mion PLLC

(57) ABSTRACT

A white porous polyester film of the present invention comprising a polyester-based monopolymer/copolymer blend, a crystalline polymer resin which is not miscible with a polyester and has a heat deformation temperature of 90° C. or higher, inorganic particles, a whitening agent, and a stabilizing agent has improved optical properties, and thus is useful as a film for use in printing, labeling, electronics, and display applications.

9 Claims, 1 Drawing Sheet

(56) References Cited

OTHER PUBLICATIONS

European Patent Office, Communication dated Sep. 9, 2014, issued in corresponding European application No. 10173340.0.

National Industrial Chemicals Notification and Assessment Scheme, Full Public Report, Feb. 1, 2001, pp. 1-19, XP055134505, Sydney, Australia.

* cited by examiner

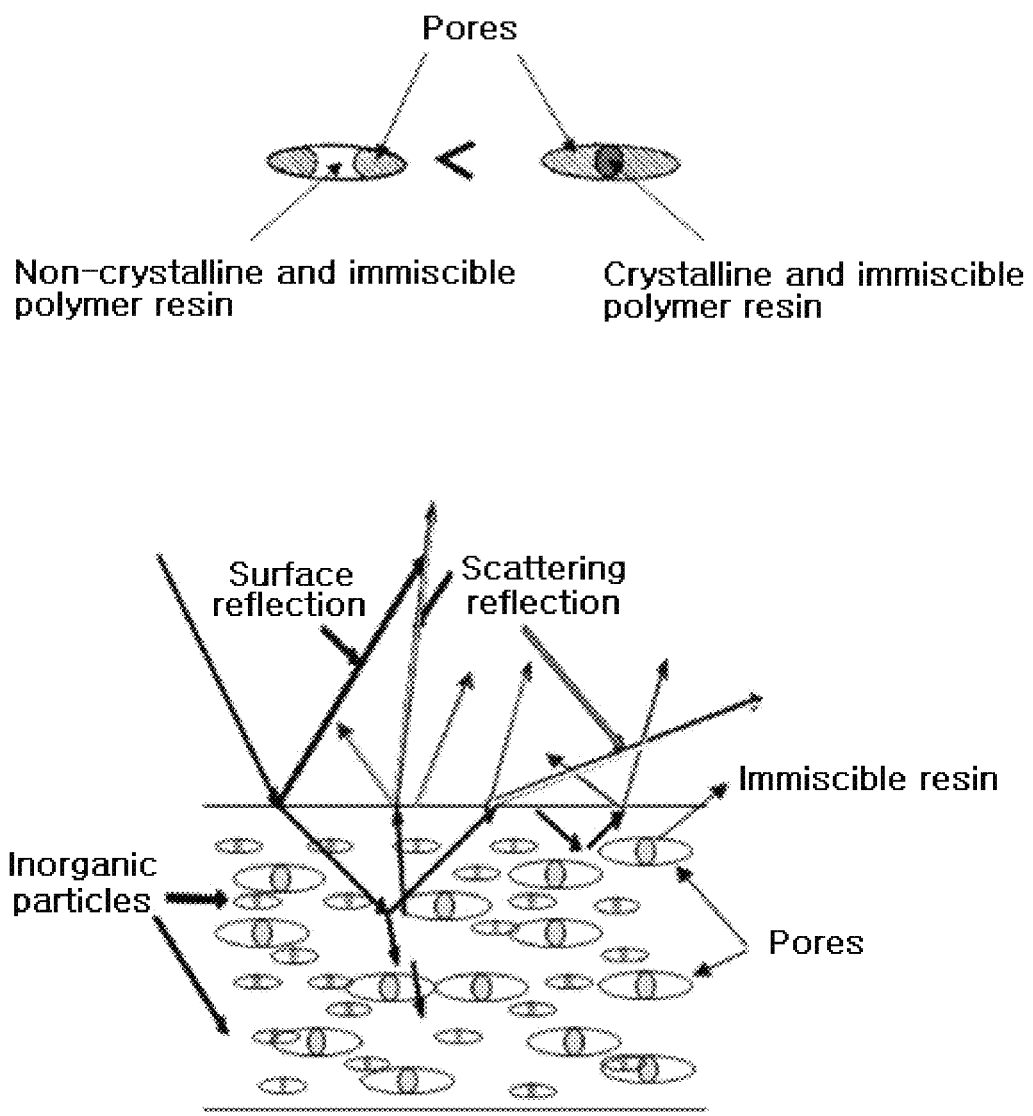

WHITE POROUS POLYESTER FILM AND PREPARATION METHOD THEREOF

FIELD OF THE INVENTION

The present invention relates to a white porous polyester film having improved optical properties in terms of whiteness, reflectance, and masking ability; and a method for preparing same.

BACKGROUND OF THE INVENTION

White porous polyester films have been used in printing, labeling, electronics and display applications, because of their excellent whiteness, reflectance, and masking properties. Such a polyester film has been generally prepared by incorporating an organic or inorganic additive for forming voids. For example, JP Patent Laid-Open No. S58-50625 suggests the use of a foaming agent for generating voids, and JP Application Laid-Open No. S57-49648, the use of a polyolefin resin.

However, the method of using the foaming agent is hard to generate uniform-sized voids when the processing temperature is not carefully controlled. In addition, the polyolefin resin is not miscible with a polyester resin during extrude molding and drawing processes, and thus, uniform pore-formation cannot be achieved, which leads to film breakage during the drawing process for preparing the film, leading to unsatisfactory whiteness, reflectance and masking properties.

In order to overcome such problems, there has been reported a technique to add a compatibilizer to a polyester resin, but this technique suffers from such problems as low heat-stability of the compatibilizer and undesired migration thereof to the film surface, which limits its industrial applications.

Further, films having various functions have been used as the reflection film of a liquid crystal display (LCD), but bending and unwanted dark lines in the back light unit (BLU) appear due to specular reflection effects (not scattering reflection effects) of inorganic materials incorporated therein.

SUMMARY OF THE INVENTION

Accordingly, it is an object of the present invention to provide a white porous polyester film which has satisfactory properties in terms of whiteness, reflectance, masking ability, and weather-resistance; and a method for preparing same.

In accordance with an aspect of the present invention, there is provided a white porous polyester film comprising a polyester-based monopolymer/copolymer blend, a crystalline polymer resin which is not miscible with a polyester and has a heat deformation temperature of 90° C. or higher, inorganic particles, a whitening agent, and a stabilizing agent, wherein the sum of the amounts of the crystalline polymer resin and the inorganic particles is in the range of 10 to 45 wt % based on the total weight of the film.

In accordance with another aspect of the present invention, there is provided a method for preparing a white porous polyester film comprising:

(a) blending a polyester-based monopolymer/copolymer blend, a crystalline polymer resin which is not miscible with a polyester and has a heat deformation temperature of 90° C. or higher, inorganic particles, a whitening agent, and a stabilizing agent such that the sum of the amounts of the crystalline polymer resin and the inorganic particles is in the range of 10 to 45 wt % based on the total weight of the film;

(b) melt-extruding the blended resin to obtain a film sheet; and (c) biaxially drawing the sheet in the longitudinal and transverse directions.

BRIEF DESCRIPTION OF THE DRAWINGS

The above and other objects and features of the present invention will become apparent from the following description of the invention, when taken in conjunction with the accompanying drawing:

FIG. 1 shows a schematic diagram illustrating two kinds of voids which are formed inside the inventive polyester film by the co-use of a crystalline polymer resin which is not miscible with a polyester and inorganic particles.

DETAILED DESCRIPTION OF THE INVENTION

The white porous polyester film according to the present invention comprises a polyester-based monopolymer/copolymer blend, a crystalline polymer resin which is not miscible with a polyester and has a heat deformation temperature of 90° C. or higher, inorganic particles, a whitening agent, and a stabilizing agent, wherein the sum of the amounts of the crystalline polymer resin and the inorganic particles is in the range of 10 to 45 wt % based on the total weight of the film.

The polyester-based blend used in the present invention is obtained by blending polyester-based monopolymer and polyester-based copolymer resins. The inventive film comprising such a polyester-based blend, as compared to conventional polyester films, has enhanced drawing processing stability even against high ratio-drawing, and therefore, it can contain in a large amount additives for enhancing its optical property. It is preferred that the weight ratio of the polyester-based monopolymer and the copolymer is in the range of 8:2 to 2:8.

The polyester-based monopolymer resin includes polyethylene terephthalate (PET), polyethylene naphthalate (PEN), and a mixture thereof, which may be prepared by condensation polymerizing an acid component comprising an aromatic dicarboxylic acid with a glycol component comprising an alkylene glycol. Representative examples of the aromatic dicarboxylic acid include dimethyl terephthalic acid, terephthalic acid, isophthalic acid, dimethyl-2,5-naphthalene dicarboxylic acid, naphthalene dicarboxylic acid, cyclohexane dicarboxylic acid, diphenoxyethane dicarboxylic acid, diphenyl dicarboxylic acid, diphenylether dicarboxylic acid, anthracene dicarboxylic acid, α,β-bis(2-chlorophenoxy)-ethane-4,4-dicarboxylic acid, and a mixture thereof. Representative examples of the alkylene glycol include ethylene glycol, trimethylene glycol, tetramethylene glycol, pentamethylene glycol, hexamethylene glycol, hexylene glycol, and a mixture thereof.

The polyester-based copolymer resin may be prepared using isophthalic acid, dimethyl isophthalate, or cyclohexane dimethanol as a monomer in the process of preparing the polyester-based monopolymer resin.

The polyester-based monopolymer/copolymer blend may be used in an amount of 50 to 89 wt % based on the total weight of the film.

In the present invention, the inorganic particles are used to control the optical properties of the film such as light transmittance, reflectance, and color tone, as well as other properties such as frictional coefficient, surface roughness, and minute touch, and they are added to the blend by way of compounding. Representative examples of the inorganic particles include particles of barium sulfate, titanium dioxide, calcium carbonate, silica, kaoline, talc, zeolite, and a mixture thereof.

It is desired that the inorganic particles have an average particle diameter of 0.1 to 0.7 μm, preferably 0.2 to 0.4 μm to facilitate void formation during drawing, increasing the reflectance of the final film.

In order to more and more enhance the void formation function of the inorganic particles, the inventive polyester film also comprises the crystalline polymer resin immiscible with a polyester.

The crystalline polymer resin should have a heat deformation temperature of 90° C. or higher to inhibit its deviation from the inorganic particles and its deformation during drawing as well as to enhance the heat-stability of the final film. Preferably, with regard to immiscibility with a polyester, the crystalline polymer resin has a mixing enthalpy value with polyesters of at least 0.2 $(MJm^{-3})^{1/2}$. Suitable a crystalline polymer resin used in the present invention includes syndiotactic polystyrene. Such a crystalline polymer resin better maintains a sphere form in the film, leading to smooth formation of voids, as compared to a noncrystalline polymer resin, as shown in FIG. 1.

Due to the combination of the inorganic particles and the crystalline polymer resin immiscible with a polyester, two kinds of voids having respective average diameters ranging from 1 to 5 μm and from 10 to 20 μm may be preferably formed in the inventive film (see FIG. 1). Wherein, the voids having an average diameter ranging from 1 to 5 μm may be generated in the interface between the inorganic particles and the blend; and the voids having an average diameter ranging from 10 to 20 μm, in the interface between the crystalline polymer resin and the blend, especially by high ratio-drawing. Generation of such two kinds of voids remarkably increases the density of total voids in the film, and consequently, it enhances optical property of the film such as scattering reflectance without generating bending and dark lines in the back light unit (BLU).

The sum of the amounts of the crystalline polymer resin and the inorganic particles is in the range of 10 to 45 wt % based on the total weight of the film. When the sum of the amounts is less than 10 wt %, the above-mentioned effect is not obtained, and when more than 45 wt %, the film processing property becomes poor and it is difficult to perform efficient drawing, which causes lowering of optical property of the film. The crystalline polymer resin and the inorganic particles may be used in amounts of 4 to 15 wt % and 6 to 30 wt %, respectively, based on the total weight of the film.

The inventive polyester film comprises preferably a hydroxyphenyltriazine-based compound such as 2-(4,6-diphenyl-1,3,5-triazine-2-yl)-5-hexyloxyphenol as the stabilizing agent, especially a UV stabilizing agent. The stabilizing agent may be used in an amount of 0.01 to 5 wt % based on the total weight of the film.

The inventive polyester film further comprises a whitening agent to enhance the whiteness and reflectance of the film. The reflectance of the film may be measured using L*(lightness) and b*(level of yellow and blue) values of CIELAB system. If the L* value is less than 95.00, the reflectance of the film becomes unsatisfactory. If the b* value is more than 3.00, the film's appearance becomes yellow and the reflectance deteriorates. Accordingly, in order to enhance the reflectance of the film at a wavelength of 420~470 nm by increasing the L* value and decreasing the b* value of CIELAB system, the whitening agent is preferably used in an amount of 0.01 to 0.2 wt %, more preferably 0.05 to 0.15 wt % based on the total weight of the film. As the whitening agent, 2,2'-(1,2-ethendiyldi-4,1-phenylene)bisbenzoxazole or 2,2-(4,4-diphenol vinyl)dibenzoxazole is preferred.

If necessary, the white porous polyester film according to the present invention may further comprise in conventional amounts other components such as a condensation polymerization catalyst, dispersant, electrostatic generator, crystallization accelerator, antiblocking agent, and lubricant.

The inventive polyester film preferably has a whiteness index of at least 95%, a light transmittance of 5% or less, an average reflectance at a wavelength range of 400 to 700 nm of at least 95%, and a reflectance at 550 nm wavelength of at least 95%.

In addition, the inventive polyester film preferably has a density of 0.8 to 1.2 g/cm$^3$ and a thickness of 50 to 400 μm.

The inventive white porous polyester film may be prepared by (a) blending a polyester-based monopolymer/copolymer blend, a crystalline polymer resin which is not miscible with a polyester and has a heat deformation temperature of 90° C. or higher, inorganic particles, a whitening agent, and a stabilizing agent such that the sum of the amounts of the crystalline polymer resin and the inorganic particles is in the range of 10 to 45 wt % based on the total weight of the film; (b) melt-extruding the blended resin to obtain a film sheet; and (c) biaxially drawing the sheet in the longitudinal and transverse directions.

In step (b), it is preferred that the blended resin remains in a molten state for a period of 0.5 to 3 min. When staying with a molten state is too long, a chemical reaction within the blended resin is excessive, which causes the blending with too small particle units to make the size of voids to be formed during drawing too small. When staying with a molten state is too short, an unsatisfactory blending or a slight chemical reaction occurs. Both of the two cases result in reflectance deterioration.

In step (c), the sheet may be drawn in the longitudinal and transverse directions preferably at a draw ratio of 3 to 6, more preferably 3 to 4.5, respectively.

In the present invention, the biaxially drawing procedure is preferably conducted in multi steps, at least two in both the longitudinal and transverse directions, to increase the efficiency of void formation without film breakage. For example, the first drawing step in either direction is conducted at a temperature higher than Tg of the polyester-based blend by 10 to 30° C. at a draw ratio of at least 1.5, before the second drawing step.

The inventive white porous polyester film has improved optical properties such as whiteness, reflectance, and masking ability, and thus it is useful as a film for use in printing, labeling, electronics, and display applications.

The present invention is further described and illustrated in Examples, which are, however, not intended to limit the scope of the present invention.

Example 1

Dimethyl terephthalate was mixed with ethylene glycol in an equivalent ratio of 1:2, to which 0.03 wt % of manganese acetate (a transesterification catalyst) was added to obtain bis-2-hydroxyethyl terephthalate as a terephthalate monomer. Thereto, 0.2 wt % of tetrakis-3,5-di-tert-butylhydroxyphenyl propanoylmethylmethane and 0.05 wt % of antimony oxide (a condensation polymerization catalyst) were added, and the resulting mixture was subject to condensation polymerization to obtain a first polyester resin (Tg 73° C.) having an intrinsic viscosity of 0.66 dl/g.

Alternatively, a second polyester resin (Tg 73° C. and Mp 200° C.) was prepared using isophthalic acid as a monomer in the process of preparing the first polyester monopolymer resin, wherein the second polyester resin obtained above had 80 to 90 wt % of terephthalic acid and 10 to 20 wt % of isophthalic acid as an acid component in its repeated unit, and had an intrinsic viscosity of 0.66 dl/g.

In a biaxial extruder were blended 34 wt % of the first polyester resin, 33.9 wt % of the second polyester resin, 6 wt % of syndiotactic polystyrene (a crystalline polymer resin immiscible with a polyester) having a heat deformation temperature of 98° C., 25 wt % of barium sulfate (inorganic particles), 1.0 wt % of Tinuvin UV1577 (Ciba, an UV stabilizing agent), and 0.1 wt % of OB-1 (Eastman Kodak, a whitening agent) based on the total weight of the mixture. Chips consisting of the mixture were dried and melt-extruded according to the conventional polyester film manufacturing method to obtain a film sheet. The film sheet was drawn in the longitudinal direction in two steps at a draw ratio of 1.5 and 2.5 at 85° C., and then in the transverse direction in two steps at a draw ratio of 1.2 and 2.0 at 125° C., to obtain a biaxially drawn polyester film with a 225 µm thickness.

Examples 2 and 3, and Comparative Examples 1 and 2

The procedure of Example 1 was repeated employing the amounts shown in Table 1, to obtain various biaxially drawn films.

Comparative Example 3

The procedure of Example 1 was repeated except that a norbornene-ethylene copolymer (Topas-5013F, 6013F and 6015S, Polyplastics, a noncrystalline polymer resin immiscible with a polyester) was used instead of the crystalline polymer resin, and respective ingredients were used in the amounts shown in Table 1, to obtain a biaxially drawn film.

Comparative Example 4

The procedure of Example 1 was repeated except that polymethylmethacrylate (a polymer resin miscible with a polyester) was used instead of the crystalline polymer resin, and respective ingredients were used in the amounts shown in Table 1, to obtain a biaxially drawn film.

The polyester films manufactured in Examples 1 to 3 and Comparative Examples 1 to 4 were evaluated for the following properties, and the results are listed in Table 1.
(1) Whiteness Index The whiteness index of a film was measured in accordance with the ASTM E313 using a spectro-photometer (Hunterlab, U.S.A.).
(2) Reflectance The reflectance of a film was measured at 550 nm wavelength using a spectro-photometer (Hunterlab, U.S.A.).
(3) L*(Lightness) and b*(Level of Yellow and Blue) Values of CIELAB System The L* and b* values of a film were measured using a spectro-photometer (Hunterlab, U.S.A.)
(4) Process Stability The process stability of a film was determined by measuring the longitudinal direction (MD)/transverse direction (TD) maximum drawing ratio and the frequency of film breakage in the biaxially drawing process of preparing the film.

TABLE 1

| | Composition of film | | | | | | Properties of final film | | | | |
|---|---|---|---|---|---|---|---|---|---|---|---|
| | First resin | Second resin | Polymer | | Inorganic particles | Stabilizing agent | Whitening agent | (1) | (2) | (3) | | |
| | (wt %) | (wt %) | Miscibility | Amount (wt %) | (wt %) | (wt %) | (wt %) | (%) | (%) | L* | b* | (4)*[1] |
| Ex. 1 | 34 | 33.9 | X | 6 | 25 | 1.0 | 0.1 | 125 | 97 | 99.6 | −6.0 | ◉ |
| Ex. 2 | 41.9 | 42 | X | 5 | 10 | 1.0 | 0.1 | 96 | 95.7 | 98.1 | −2.6 | ◉ |
| Ex. 3 | 30.9 | 31 | X | 10 | 27 | 1.0 | 0.1 | 128 | 96.4 | 99.8 | −7.3 | ○ |
| C.E. 1 | 45.9 | 45 | X | 3 | 5 | 1.0 | 0.1 | 94 | 93.6 | 97.4 | −1.2 | ◉ |
| C.E. 2 | 25.9 | 26 | X | 16 | 31 | 1.0 | 0.1 | 129 | — | — | — | X*[2] |
| C.E. 3 | 69.9 | 0 | X | 8*[3] | 21 | 1.0 | 0.1 | 124 | 96.2 | 99.5 | −4.1 | Δ |
| C.E. 4 | 50 | 27.9 | O | 6 | 15 | 1.0 | 0.1 | 117 | 93.4 | 98.1 | −1.8 | ○ |

(1) whiteness index
(2) reflectance
(3) L* and b* values of CIELAB system
(4) process stability
*[1] ◉ - very good, ○ - good, Δ - poor, X - very poor
*[2] very poor process stability and poor drawing ability
*[3] noncrystalline polymer resin As shown in Table 1, the films of Examples 1 to 3 according to the present invention showed improved properties in terms of whiteness, reflectance, and process stability, while that of Comparative Example 1 showed inferior results in terms of whiteness and reflectance; that of Comparative Example 2, in terms of reflectance, L* and b* values, process stability, and drawing ability; that of Comparative Example 3, in terms of process stability; and that of Comparative Example 4, in terms of reflectance and b* value.

While the invention has been described with respect to the above specific embodiments, it should be recognized that various modifications and changes may be made to the invention by those skilled in the art which also fall within the scope of the invention as defined by the appended claims.

What is claimed is:
1. A white porous polyester film comprising
a blend of a polyester-based monopolymer and a polyester-based copolymer;

a crystalline polymer resin which is not miscible with a polyester and has a heat deformation temperature of 90° C. or higher, wherein the crystalline polymer consists of a syndiotactic polystyrene;

inorganic particles;

a whitening agent; and a stabilizing agent, wherein the amounts of the crystalline polymer resin and the inorganic particles are in the range of 4 to 15 wt % and 15 to 30 wt %, respectively, based on the total weight of the film;

wherein the sum of the amounts of the syndiotactic polystyrene and the inorganic particles is in the range of 19 to 45 wt % based on the total weight of the film;

wherein the blend is obtained by blending: (a) a polyester-based monopolymer resin selected from the group consisting of polyethylene terephthalate, polyethylene naphthalate, and a mixture thereof; and (b) a polyester-based copolymer resin prepared from isophthalic acid, dimethyl isophthalate, or cyclohexane dimethanol as a monomer, wherein the weight ratio of (a) the polyester-based monopolymer and (b) the polyester-based copolymer is in the range of 8:2 to 2:8;

wherein the inorganic particles are selected from the group consisting of particles of barium sulfate, titanium dioxide, calcium carbonate, silica, kaoline, talc, zeolite, and a mixture thereof, each having an average particle diameter of 0.1 to 0.7 μm; and wherein the film comprises a first population of voids having an average diameter ranging from 1 to 5 μm in the interface between the inorganic particles and the polyester resin and a second population of voids having an average diameter ranging from 10 to 20 μm in the interface between the crystalline polymer resin and the polyester resin.

2. The white porous polyester film of claim 1, wherein the syndiotactic polystyrene resin has a mixing enthalpy value with a polyester of at least 0.2 $(MJm^{-3})^{1/2}$.

3. The white porous polyester film of claim 1, wherein the film comprises the blend of polyester-based monopolymer and polyester-based copolymer, the whitening agent, and the stabilizing agent in amounts of 50 to 89 wt %, 0.01 to 0.2 wt %, and 0.01 to 5 wt %, respectively, based on the total weight of the film.

4. The white porous polyester film of claim 1, wherein the film has a whiteness index of at least 95%, a light transmittance of 5% or less, an average reflectance at a wavelength range of 400 to 700 nm of at least 95%, and a reflectance at 550 nm wavelength of at least 95%.

5. The white porous polyester film of claim 1, wherein the whitening agent is 2,2'-(1,2-ethendiyldi-4,1-phenylene)bis-benzoxazole or 2,2-(4,4-diphenol vinyl)dibenzoxazole.

6. A method for preparing a white porous polyester film comprising:

(i) mixing a blend of polyester-based monopolymer and a polyester-based copolymer, a crystalline polymer resin which is not miscible with a polyester and has a heat deformation temperature of 90° C. or higher, inorganic particles, a whitening agent, and a stabilizing agent such that the sum of the amounts of the crystalline polymer resin and the inorganic particles is in the range of 19 to 45 wt % based on the total weight of the film, wherein the amounts of the crystalline polymer resin and the inorganic particles are in the range of 4 to 15 wt % and 15 to 30 wt %, respectively, based on the total weight of the film;

(ii) melt-extruding the blended resin to obtain a film sheet; and (iii) biaxially drawing the sheet in the longitudinal and transverse directions, wherein the crystalline polymer consists of a syndiotactic polystyrene;

wherein the blend is obtained by mixing (a) a polyester-based monopolymer resin selected from the group consisting of polyethylene terephthalate, polyethylene naphthalate, and a mixture thereof; and (b) a polyester-based copolymer resin prepared from isophthalic acid, dimethyl isophthalate, or cyclohexane dimethanol as a monomer, wherein the weight ratio of (a) the polyester-based monopolymer and (b) the polyester-based copolymer is in the range of 8:2 to 2:8;

wherein the inorganic particles are selected from the group consisting of particles of barium sulfate, titanium dioxide, calcium carbonate, silica, kaoline, talc, zeolite, and a mixture thereof, each having an average particle diameter of 0.1 to 0.7 μm;

wherein the film comprises two populations of voids having respective average diameters ranging from 1 to 5 μm and from 10 to 20 μm; and wherein the film comprises a first population of voids having an average diameter ranging from 1 to 5 μm in the interface between the inorganic particles and the polyester resin and a second population of voids having an average diameter ranging from 10 to 20 μm in the interface between the crystalline polymer resin and the polyester resin.

7. The method of claim 6, wherein in step (b), the blended resin remains in a molten state for a period of 0.5 to 3 min.

8. The method of claim 6, wherein in step (c), the sheet is drawn in the longitudinal and transverse directions at a draw ratio of 3 to 6, respectively.

9. The method of claim 6, wherein in step (c), the sheet is drawn in multi steps of at least two in both the longitudinal and transverse directions, the first drawing step in either direction being conducted at a temperature higher than Tg of the polyester-based blend by 10 to 30° C. at a draw ratio of at least 1.5, before the second drawing step.

\* \* \* \* \*